(No Model.) 3 Sheets—Sheet 1.
C. H. TAYLOR.
CORN SEPARATOR, HUSKER, AND FODDER SLITTER.
No. 518,358. Patented Apr. 17, 1894.
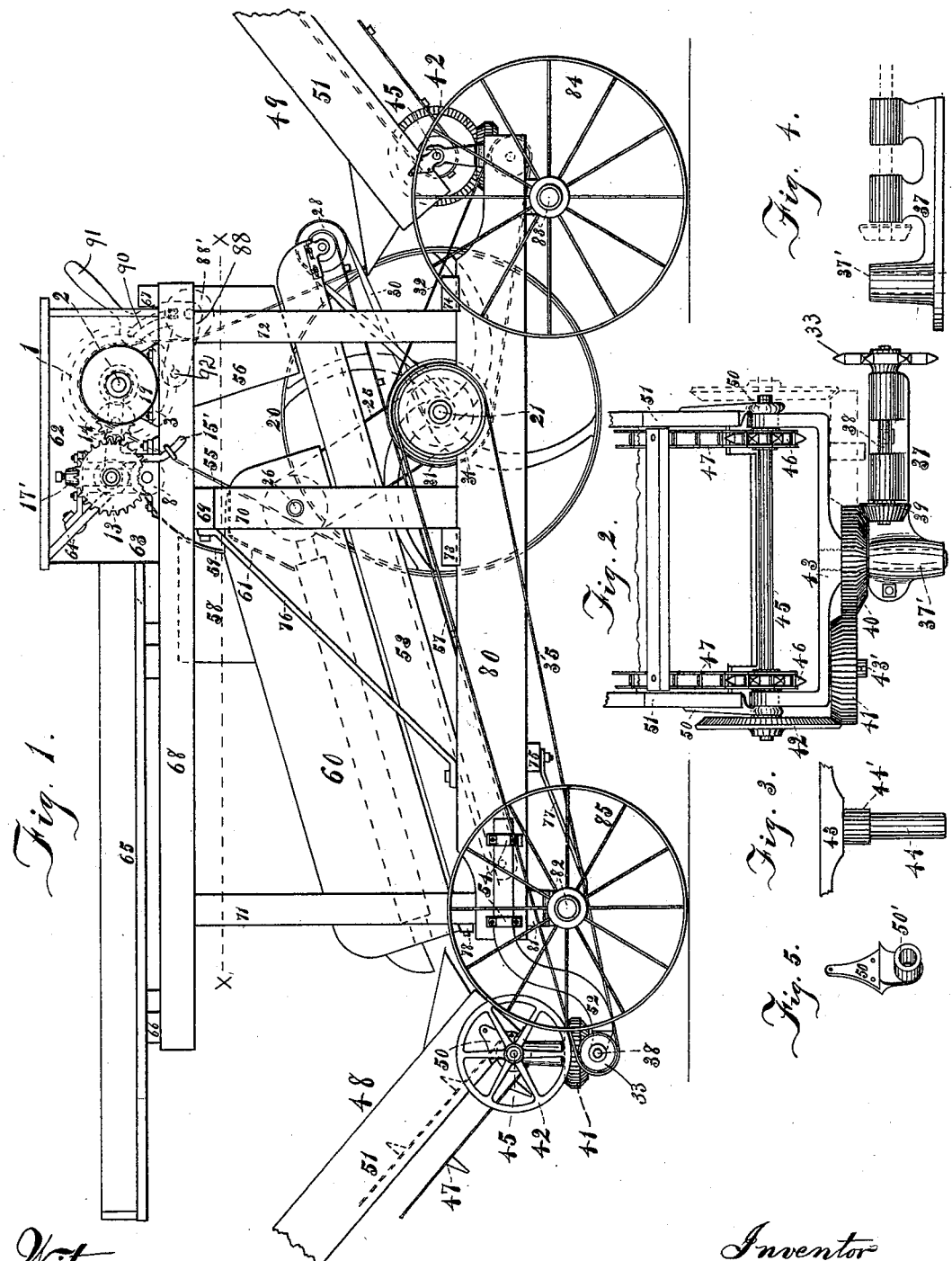
Witnesses
Frederick Shepherd.
Harry L. Markell.
Inventor
Charles H. Taylor.

(No Model.) 3 Sheets—Sheet 2.
C. H. TAYLOR.
CORN SEPARATOR, HUSKER, AND FODDER SLITTER.
No. 518,358. Patented Apr. 17, 1894.
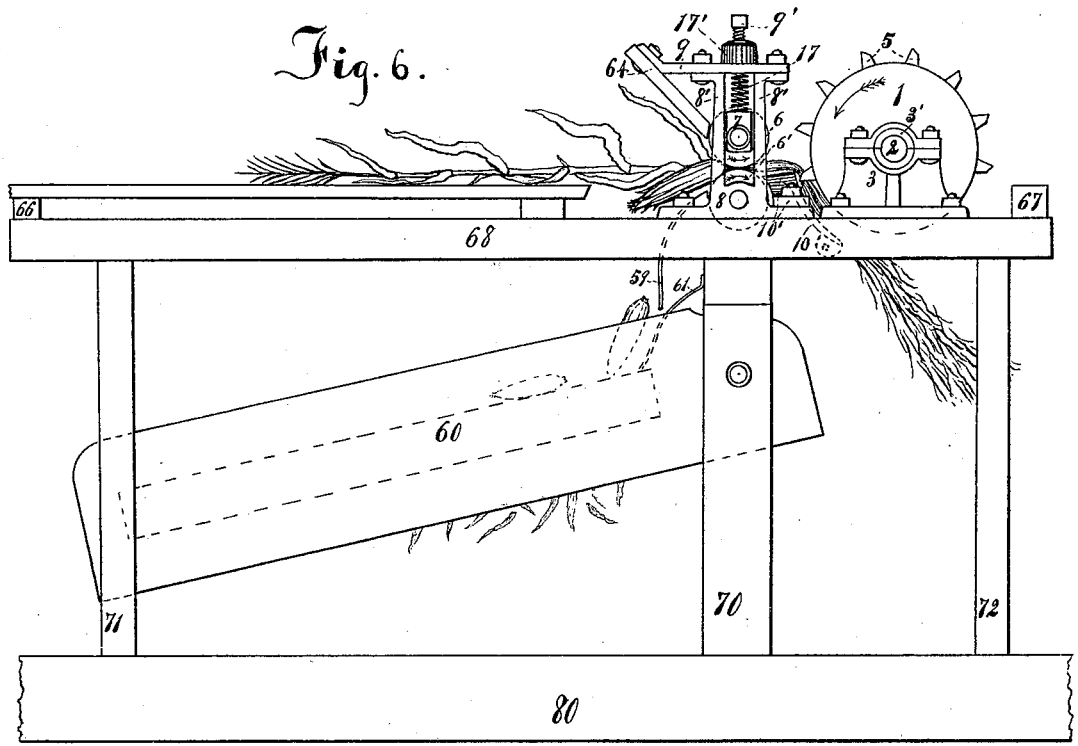
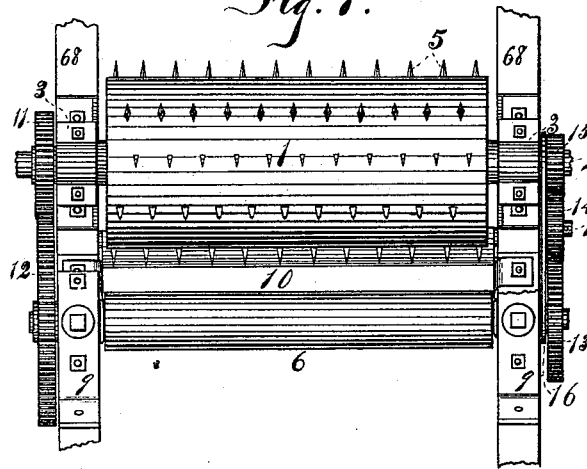
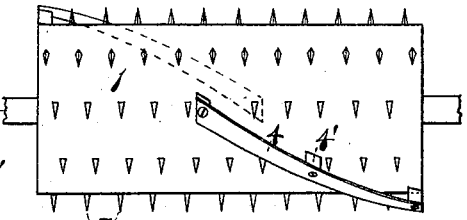
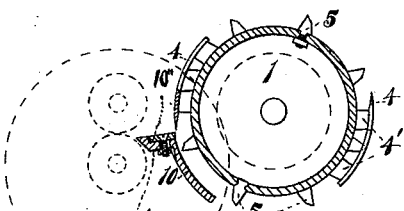
Witnesses
Frederick Shepherd.
Harry L. Barkell.
Inventor
Charles H. Taylor (No Model.) 3 Sheets—Sheet 3.
C. H. TAYLOR.
CORN SEPARATOR, HUSKER, AND FODDER SLITTER.

No. 518,358. Patented Apr. 17, 1894.

Witnesses
Frederick Shepherd.
Harry L. Markell.

Inventor
Charles H. Taylor.

THE NATIONAL LITHOGRAPHING COMPANY,
WASHINGTON, D. C.

UNITED STATES PATENT OFFICE.

CHARLES H. TAYLOR, OF LINCOLN, NEBRASKA.

CORN SEPARATOR, HUSKER, AND FODDER-SLITTER.

SPECIFICATION forming part of Letters Patent No. 518,358, dated April 17, 1894.

Application filed September 6, 1892. Serial No. 445,203. (No model.)

*To all whom it may concern:*

Be it known that I, CHARLES H. TAYLOR, a citizen of the United States, residing at Lincoln, in the county of Lancaster and State of Nebraska, have invented new and useful Improvements in Corn Separators, Huskers, and Fodder-Slitters, of which the following is a specification.

This invention has for its object to provide a new and improved machine which is portable and wherein provision is made for conveniently, rapidly and efficiently performing the work of separating corn from fodder, husking the ears and preparing the fodder to place it in the best condition for handling, feeding, baling or storing. To accomplish this object my invention involves the features of construction and the combination or arrangement of devices hereinafter described and claimed, reference being made to the accompanying drawings, in which—

Figure 10:
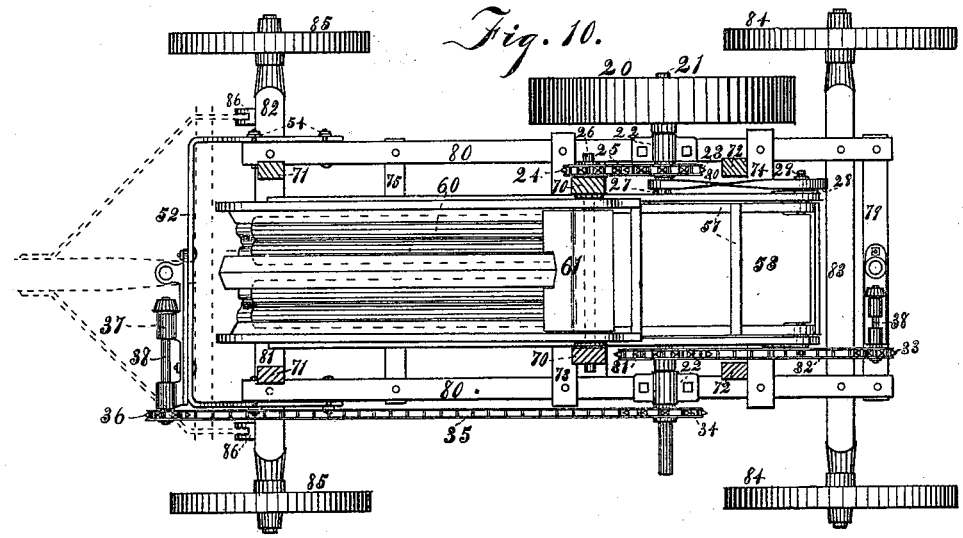
Figure 11:
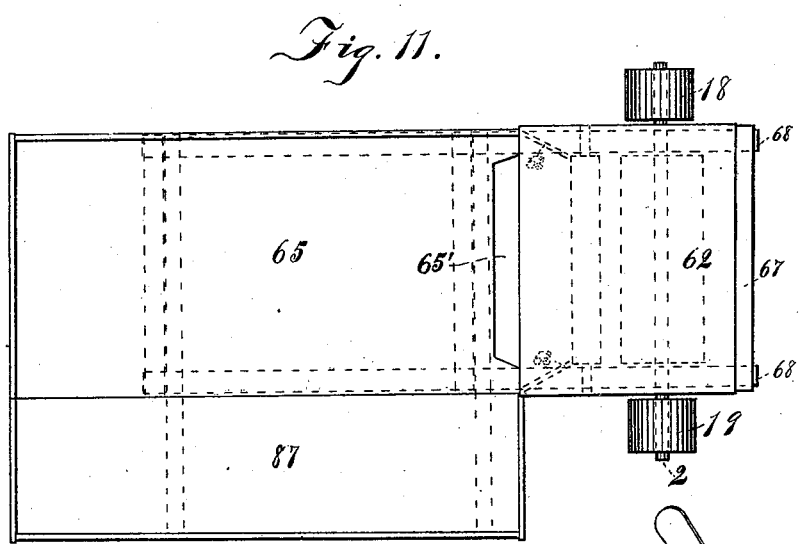
Figures 12, 13:
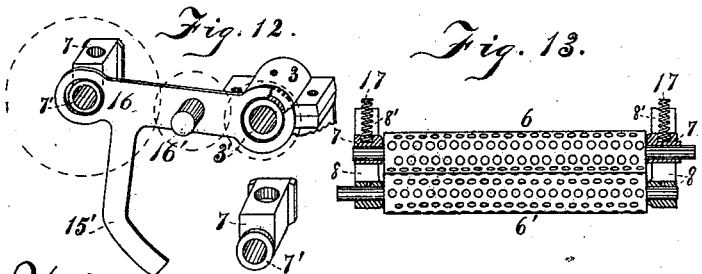
Figure 14:
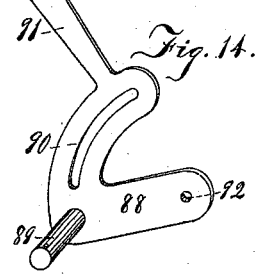

Figure 1, is a side elevation of a machine embodying my invention, portions of the corn and fodder elevators being broken away. Fig. 2, is a detail front elevation showing a portion of the fodder elevator mechanism. Figs. 3, 4 and 5, are detail views of portions of the corn elevator mechanism hereinafter explained. Fig. 6, is a detail side elevation of a portion of the machine to more clearly illustrate the action of the snapping rollers and slitting cylinder. Fig. 7, is a detail top plan view of the slitting cylinder, the snapping rollers and the gearing which transmits motion from the cylinder shaft to the rollers. Fig. 8, is a detail top plan view showing a modified construction of slitting cylinder. Fig. 9, is a transverse sectional view of the same, showing also the cross or concaved plate carrying a shear blade, the snapping rollers being exhibited by dotted lines. Fig. 10, is a top plan view of that portion of the machine beneath the line $x$—$x$ Fig. 1, the corn and fodder elevators being omitted. Fig. 11, is a plan view of that portion of the machine above the line $x$—$x$ Fig. 1. Figs. 12, 13 and 14, are detail views hereinafter explained.

In order to enable those skilled in the art to make and use my invention I will now describe the same in detail, referring to the drawings wherein the machine is represented in Figs. 1 and 10 as mounted on wheels for rendering it susceptible of convenient transportation from place to place, although the machine is designed to be stationary when in operation. The trucks consist of the rear wheels 84, rear axle 83 and front wheels 85 mounted on the ends of an axle 82 which has a swivel connection at its center with the bolster 81. The front axle is steadied by a suitable brace 77, the rear end of which is attached to a cross piece 75 secured to the main side sills 80, while the front end has a swivel connection with the under side of the front axle at the center thereof. The ends of the main side sills are mounted on the bolster 81 and rear axle 83 and the sills are securely connected and held at the proper distance apart by said bolster and axle and the cross pieces 73 and 74. The uprights or standards 70, 71 and 72 rise from the main side sills 80, and to the upper ends of the uprights or standards 70, is secured a cross piece 69 which supports the upper side beams 68, the end portions of which are rigidly secured to the standards or uprights 71 and 72. The forward ends of the beams 68 are connected by a cross piece 66, and the rear ends by a cross piece 67, and the structure is strengthened lengthwise by braces 76, one at each side of the machine.

The corn husking portion 60 of the machine may be constructed substantially as described in my application for Letters Patent, filed August 9, 1890, Serial No. 361,558. The main frame of the corn husker is secured at its upper end between the uprights or standards 70, in such manner that the lower end can be raised and lowered to adjust the husker to any desired angle of inclination. The lower end of the husker is adjustably supported through the medium of a cross piece 78 which may be secured to the uprights or standards 71 at any desired height. The rear end portions of the upper side beams 68 support boxings 3, which constitute bearings for the shaft 2, of a slitting cylinder 1, the periphery of which is furnished with numerous steel teeth or knives 5 sharpened along their length so that they will split the stalks lengthwise into strips or shreds. In juxtaposition to the bearings 3, the beams 68 are provided with boxings 8, which constitute bearings for the lower one 6' of a pair of snapping or separating rollers. The boxings 8 are constructed with vertical arms 8' between which, at each side of the machine, is arranged a vertically movable boxing 7 acted upon by a spring 17 as clearly shown in Fig. 6. The upper ends of the arms 8' are connected by a cap plate 9 having the sockets or bearings 17' for the upper ends of the springs 17. The boxings 7 may also be provided with pockets or bearings for the lower ends of these springs. The upper snapping or separating roller 6 is constantly pressed downward toward the lower roller through the medium of the springs so that as the corn stalks are fed between the rollers they will be squeezed so tightly as to avoid slipping and prevent a stoppage of the feed, while the ears of corn when they come in contact with the rollers will be immediately snapped off. The tension of the springs 17 can be varied through the medium of screws 9' Fig. 6, for the purpose of increasing or decreasing pressure upon the upper snapping roller. The space between the lower snapping roller 6' and the points of the teeth 5 on the slitting cylinder 1 is covered over by a combined bridge piece and concave plate composed of a cross-plate 10', a portion 10 of which extends downward a short distance and is concaved so that it can lie in close proximity to the points of the cylinder teeth and thereby guide the fodder into the path of such teeth. This enables the teeth to slit every portion of the fodder into fine strips as the fodder is fed between the snapping rollers. The bridge or cross-plate 10 is held in proper position by bolting it to the upper side beams 68, and preferably the bolts which secure the boxing 8 to the side beams are utilized for this purpose. The depending portion 10 which constitutes the concave plate of the bridge piece 10' is concentric with the slitting cylinder 1, and it serves to support the stalks while they are acted upon by the narrow pointed, sharpened blades of the cylinder. In this respect my invention differs from ordinary fodder cutters which merely cut the fodder transversely, because in the latter type of machines, as soon as the knives pass the shear edge of the bridge, the stalks are entirely severed from the portions resting on the bridge, and drop freely into a chute or receptacle below. In a fodder slitting machine, however, it is essential to preserve the fodder in juxtaposition to the points of the teeth as the fodder passes downward and rearward from the upper surface of the bridge piece or plate, for which reason it is necessary, in order to obtain the best results, to employ a concave plate struck from the center of the slitting cylinder, or approximately so, so that the concave plate is parallel, or concentric with said cylinder. The cap plate 9 is extended to constitute a bearing for an incline or slanting board or plate 64 Fig. 6, which extends substantially the entire length of the snapping rollers and which, in connection with the side boards or plates 63, form a chute to guide the ends of the corn stalks between the snapping rollers.

The slitting cylinder 1 is inclosed and covered by a cap 62 which can be removed and replaced as occasion demands.

A horizontal table 65, supported by the upper side beams 68, is arranged in front of the snapping rollers and is provided with a lateral or side table 87, Fig. 11, upon which the fodder is first placed in bunches or armfuls. The attendant stands by the side of the table 65 and takes the stalks from the bunches, spreads them out upon the main table and starts a few of them at a time between the snapping rollers. This manner of feeding the stalks is continued as long as the machine is in operation. The main table 65 is cut away at a point in front of the snapping rollers, for example as at 65', Fig. 11 to provide a suitable space for the ears of corn to drop through into the husker, 60.

By reference to Figs. 6 and 9 it will be seen that the plane of travel of the stalks is approximately on a level with the longitudinal axis of the slitting cylinder, so that the stalks as they pass from between the snapping rollers are guided and caused to travel endwise almost directly toward the axis of the slitting cylinder and in the path of travel of the points of the cylinder teeth, whereby the teeth are enabled to slit the stalks entirely through, and then, as they are bent downward by the stripping action of the teeth, the concave shape of the concave plate 10 serves to continually guide the stalks in the path of the teeth, so that the latter continue to slit them through and through. In this respect my invention is advantageous over prior constructions where the stalks slide over a level table above which the slitting cylinder revolves, as in such constructions the teeth of the cylinder must not be permitted to strike the table, and in practice the space between the points of the teeth and the surface of the table should not be less than about one-eighth of an inch, so that during the vibration of the machine the teeth would never strike the table. Consequently the shells of the stalks next to the table are not slitted, and the machines are therefore imperfect in practical operation. As the corn stalks pass between the snapping rollers, the ears of corn are snapped off and dropped down over a curved cross plate 59, Figs. 1 and 6, which is located between side plates 58, one at each side of the machine. The husker operates as described in my application before alluded to, to husk the ears of corn and then the ears drop into an elevator 48 by which they are elevated to the point desired. As the stalks pass between the snapping rollers they move over the bridge or cross plate 10 and are slitted to pieces by the cylinder, the slitted portions passing through a chute 56 to a husk conveyer 53, which extends in an inclined plane beneath the corn husker 60. The husk conveyer carries the husks and the slitted fodder to the husk and fodder elevator 49.

The conveyer 53 may be composed of a carrier-belt 57, mounted on shafts or pulleys at the ends of the conveyer-frame, but this conveyer may be of any other construction suitable for the conditions required for which reason I do not deem it essential to more clearly describe the same in detail.

The elevators 48 and 49 are susceptible of swinging laterally and as the devices for accomplishing this purpose are substantially the same in both elevators, the following description of one is sufficient: A bracket or casting 37, Fig. 2, is secured in a stationary position to some fixed part of the machine, as for example a support 52, Fig. 1, and is provided with bearings for a horizontal shaft 38 having a chain wheel 33 and a bevel gear 39. The bracket 37 is also provided with a socket-bearing 37' to receive a vertical shaft or stud 44, secured to or forming part of a rotatable or swinging yoke or frame 43, the arms of which constitute bearings for lateral extensions 50' of bracket bearings 50 which are secured to the side bars 51 of the elevator frame. The horizontal shaft 45 extends through the lower ends of the bracket bearings 50, whereby the weight of the elevator is supported by the arms of the yoke or frame 43 without causing undue friction on the shaft 45. The construction also permits the elevator to be raised and lowered without affecting its operation.

The shaft or stud 44, Fig. 3, is formed or provided with a collar or enlargement 44', which rests on the upper end of the socket bearing 37', and on this collar or enlargement is arranged to revolve a compound gear 40, the lower part of which is a bevel gear which engages the bevel gear 39 and the upper part of which is a spur gear which engages a gear wheel 41, mounted on a stud or shaft 43' secured to the yoke or frame 43. The gear wheel 41 is a compound gear similar to the gear 40 and engages a bevel gear 42' mounted on one end of the shaft 45, the construction being such that the elevator can be swung laterally into any position while the elevator chains or belts 47 are driven by the shaft 45.

The power will ordinarily be transmitted to the elevator by a drive belt or chain 35 which imparts motion to the shaft 38. If the drive belt or chain 35 runs in the wrong direction to drive the elevator rake forward, the shaft or stud 43', the intermediate gear 41, and the bevel gear 42 can be reversed to the opposite side of the elevator as indicated by dotted lines in Fig. 2.

The bracket or casting 37, when attached to the side of some part of the machine should be made as shown in Fig. 2, but when secured on top of some part of the machine it should be made as shown in Fig. 4. The form of the bracket or casting 37 for the corn elevator 48 is clearly shown in Fig. 2 and the one used for the fodder elevator 49 is of the form shown in Fig. 4.

By the employment of the intermediate gear 41 I am enabled to construct a practicable elevator having a wide range of lateral movement.

The elevator support 52 which extends under the corn elevator is secured to the side sills 80 through the medium of clips 54, Figs. 1 and 10.

The fodder elevator 49 may be supported by a casting 37 mounted on a cross piece 79 Fig. 10, which is secured to the rear ends of the said side sills, or this cross piece may be dispensed with and the casting 37 mounted on the rear axle 83.

All of the working parts of the machine are driven from the shaft 21 which revolves in the boxings 22, Fig. 10, secured to the sills 80, and is provided with a large pulley 20, having a belt connection 55 with a pulley 18, shown in Fig. 11, which is mounted on the shaft 2 of the slitting cylinder 1.

The cylinder shaft 2 is provided at a point just outside of one of the boxes 3, with a gear wheel 11, which meshes into a large gear wheel 12 on the projecting end of the lower snapping roller 6' and by this means rotary motion is transmitted from shaft 2 to said snapping roller 6'. The rotary motion is transmitted from the cylinder 2 to the upper snapping roller 6 at the opposite side of the machine from that on which the gear wheels 11 and 12 are located through the medium of a small spur gear 15, secured to the cylinder shaft and engaging an intermediate spur gear 14 which meshes into a larger spur gear 13 mounted on the projecting end of the upper snapping roller 6. As the upper snapping roller is susceptible of considerable vertical movement, it is necessary that the intermediate gear 14 should also be allowed to move vertically whenever said snapping roller rises or falls, so that the gear wheels 13, 14, and 15 will always remain in proper engagement. To accomplish this I employ a swinging arm or plate 16, Fig. 12, from which projects a stud 16' on which the intermediate gear 14 rotates. The rear end of the arm 16 is supported by a part of one of the boxes 3 and the front end of this arm encircles a collar 7' on one of the boxes 7 Fig. 12, so that when the snapping roller 6 and boxes 7, Fig. 13, rise or fall, the front end of the arm 16 will also rise and fall in the arc of a circle of which the cylinder shaft 2 is the center. The arm 16 is steadied and retained in proper vertical position by being provided with a downwardly extending portion 15' Figs. 1 and 12, adapted to slide in a keeper on one of the upper side beams 68.

The husking apparatus is driven as follows: On the shaft 21 is secured a sprocket wheel 23, Fig. 10, and on the end of the cross shaft 26 of the husker, is secured a sprocket wheel 24, connected with the sprocket wheel 23 by a chain belt 25. The gearing which transmits power from the shaft 26 to the husking rollers is not illustrated but in practice it is covered by a cap or case 61 shown in full lines Fig. 10, and indicated by dotted lines in Fig. 1, the purpose of which is to prevent corn, dirt, leaves and other foreign matter gaining access to the gearing. A rotary motion is transmitted from the shaft 21 to the husk and fodder conveyer 53 as follows: On the shaft 21 is mounted a pulley 27 and on the upper cross shaft 29 Fig. 10, of the husk and fodder conveyer is secured a pulley 28 connected with the pulley 27 by a belt 30 which is twisted or given a half turn to cause the conveyer rake 57 to travel in the proper direction. The power is transmitted to the fodder elevator 49 as follows: On the shaft 21 is secured a sprocket wheel 31 Fig. 10, and on the end of the shaft 38 which operates the swinging elevator gearing, is secured the sprocket wheel 33 connected with the wheel 31 by a drive chain 32. A sprocket wheel 34 is also secured on the shaft 21 which engages the belt 35, for transmitting power to the corn elevator gearing as hereinbefore explained. The belt 55 which drives the slitting cylinder may be provided with an adjustable tightening pulley 88', indicated by dotted lines in Fig. 1. This pulley rotates on a stud 89 projecting from one side of a swinging plate 88 secured to one of the beams 68 by a bolt passing through the bolt-hole 92 Fig. 14. A clamping bolt is also adapted to pass through the segmental slot 90 of the plate 88, for holding the latter in any desired position of adjustment. By pressing on the handle 91 of the plate, the belt 55 will be tightened and then by tightening up the clamping bolt which passes through the segmental slot 90, the plate will be held in a fixed position.

If the machine is operated by horse power, the tumbling rod can be connected with either end of the shaft 21; but if the machine is run by belt power as from an engine, the engine belt will run on a suitable pulley 11, Fig. 11, mounted on the cylinder shaft 2.

The snapping rollers of this machine are made with indented surfaces, or in other words, the entire surfaces of the rollers are provided at short distances apart with small depressions or cavities each one of which is entirely separate from the others, Fig. 13. These depressions should not be more than about three-fourths of an inch across and about three-sixteenths of an inch in depth, and they should never extend entirely through the shell of the roller. To provide but two or three rows of these cavities or depressions would do but little good, in that the machine would not operate successfully as the corn stalks would stop and slip between the rollers and then choke the machine. The action of the cavities or depressions upon the corn stalks when they are being passed between the rollers is as follows: When the stalks are squeezed between the rollers, that part of the stalk which is opposite the cavity or depression enters into the cavity and as the surfaces of the rollers move forward, the metal at the edge of the cavity jerks the stalks forward with a forcible, positive action, never letting them slip even if they are damp and tough.

The teeth 5 of the cylinder 1 must be sharp pointed and they are in the form of narrow blades or knives, each made with a sharpened front cutting edge extending from the point to the surface of the cylinder. These teeth may be attached to the cylinder by making the base of the teeth with notches at the edges and casting the metal of the cylinder shell upon the notched bases of the teeth; or the teeth may be constructed with screw threaded shanks secured in place by nuts as illustrated in Fig. 9.

The cylinders constructed as shown in Figs. 1, 6 and 7, will cut fodder into narrow strips, but if it is desired to also sever the fodder transversely, I employ knives 4, Figs. 8 and 9, which have their cutting edges extending along their length in contradistinction to being circular or semi-circular knives with narrow sharpened ends and arranged at right angles to the cylinder as in prior machines for slitting and cross cutting stalks. The knives 4 not only have their cutting edges extending along their length, but these knives extend lengthwise along the cylinder preferably in spiral lines. The knives are secured to the cylinder at the proper distance therefrom through the medium of blocks 4', Fig. 9, and the knives may extend from the ends of the cylinder to a point at or beyond the middle of its length, as will be understood by reference to Fig. 8. If the slitting cylinder is provided with knives 4 to sever the fodder transversely, the bridge or cross plate 10 should be provided with a steel shear blade 10'' Fig. 9, upon its upper surface so that as the knives 4 revolve past the shear blade they will cut the fodder with a shear action.

The drive belts for transmitting power may be composed of chain links or they may be ordinary belts. I prefer to employ an ordinary belt to travel on the pulleys 20 and 19.

The snapping rollers revolve at a speed less than the speed of the slitting cylinder and by feeding the stalks toward the cylinder slower than the speed of the latter, the teeth of the cylinder are enabled to tear the stalks to pieces much better and more effectively than if the snapping rollers and the cylinder rotated at the same speed.

The devices described and shown provide a machine which possesses all the necessary conveniences for transporting it from place to place, and adjusting it to various positions, while operating to perfectly perform the work of separating corn from fodder, husking the ears and preparing the fodder for feeding or storing in a practicable and satisfactory manner. By slitting the stalk portion of the fodder longitudinally into fine strips, the fodder is sufficiently fine to make good feed and yet sufficiently coarse to render it susceptible of handling with a fork, or stacking out of doors, or baling the same similar to hay. This is a decided advantage over those machines which merely cut the stalks transversely into short pieces as this requires the pieces to be handled with a shovel and stored and fed in boxes or bins, the same as grain. When the fodder is cut transversely into short sections it is also more liable to spoil if stored in large quantities, as the air cannot circulate as it can when the fodder is slitted.

The knives 4 are only designed to be used where it is desired to cut the fodder short and fine for fancy feeding with bran, or in cutting green fodder for ensilage, in which latter case the husker 60 need not be operated. The machine may be provided with a draft tongue to be attached as in dotted lines Fig. 10, when the machine is to be moved.

Having thus described my invention, what I claim is—

1. In a fodder slitting machine the combination with a table or platform over which the stalks are moved, and rotary rollers between which the stalks pass lengthwise from the table, of a rotary slitting cylinder journaled in juxtaposition to one end of the table or platform, and provided with a plurality of stalk-slitting teeth which are narrow pointed and sharpened along their length from point to base to slit the stalks into filaments or shreds, and a bridge piece having a concave plate arranged approximately concentric with the slitting cylinder and serving to support the bent down portions of the stalks while they are slitted into filaments or shreds by the teeth of the cylinder, substantially as described.

2. The combination with a table or platform over which the stalks are moved, of rotary indented snapping rollers between which the stalks pass lengthwise from the table and by which the ears of corn are removed from the stalks, and a rotary slitting cylinder journaled in juxtaposition to one end of the table or platform and provided with a plurality of stalk-slitting teeth which are narrow pointed and sharpened along their length to slit the stalks into filaments or shreds, substantially as described.

3. The combination with a table or platform over which the stalks are moved, of rotary indented snapping rollers between which the stalks pass lengthwise from the table, and by which the ears of corn are removed from the stalks, a rotary slitting cylinder journaled in juxtaposition to one end of the table or platform, and provided with a plurality of stalk-slitting teeth, and a bridge piece interposed between the snapping rollers and the cylinder and having a concave plate approximately concentric with the slitting cylinder and against which the bent down portions of the stalks rest while they are being slitted into filaments or shreds by the teeth of the cylinder, substantially as described.

4. The combination with a slitting cylinder having slitting teeth mounted thereupon for slitting stalks lengthwise into filaments or shreds, of cross-cutting knives extending lengthwise along the cylinder and having their cutting edges extending along their length, and a shear blade arranged in proximity to the cylinder and having a pendent concave plate against which the stalks are supported while they are slitted into filaments or shreds by the teeth of the cylinder, substantially as described.

5. The combination with rotary rollers between which the stalks pass lengthwise, of a cylinder provided with stalk slitting teeth for slitting the stalks into filaments or shreds, and cross cutting knives mounted on the cylinder and extending lengthwise thereof with their cutting edges along their length, and a bridge piece interposed between the rollers and the cylinder and provided with a shear blade and a pendent concave plate which is approximately concentric with the slitting cylinder for supporting the stalks while they are being slitted into filaments or shreds by the teeth of the cylinder, substantially as described.

6. The combination with a table or platform over which the stalks are moved, and rotary indented snapping rollers between which the stalks pass lengthwise from the table and by which the ears of corn are removed from the stalks, of a rotary slitting cylinder journaled in juxtaposition to one end of the table and provided with a plurality of stalk slitting teeth,—a series of cross cutting knives which have their cutting edges along their length and extend lengthwise of the cylinder, and a bridge piece interposed between the snapping rollers and the cylinder, and having a pendent concave plate approximately concentric with the cylinder for supporting the stalks while they are slitted into filaments or shreds by the teeth of the cylinder, substantially as described.

7. The combination in a fodder slitting machine, of a slitting cylinder provided with teeth for slitting the stalks into filaments or shreds, a pair of corn snapping rollers, one of which is mounted in vertically yielding boxes, a train of gears which gear the lower snapping roller direct to the shaft of the slitting cylinder at one side of the machine, and gearing at the opposite side of the machine which gears the upper snapping roller with the shaft of the slitting cylinder and comprises a gear wheel mounted on the cylinder shaft, a gear wheel on the upper snapping roller shaft, and an intermediate gear with which the gears on the cylinder shaft and snapping roller shaft directly mesh, substantially as described.

8. The combination in a fodder slitting machine, of a slitting cylinder provided with teeth for slitting stalks into filaments or shreds, a pair of corn snapping rollers, one of which is mounted in vertically yielding boxes, gearing connecting the shaft of the slitting cylinder with the lower snapping roller at one side of the machine, a gear wheel mounted on the shaft of the slitting cylinder at the opposite side of the machine, a gear wheel on the vertically yielding snapper roller, and a swinging plate or arm connected with one of the vertically yielding boxes, and carrying an intermediate gear which connects the gear on the cylinder shaft with the gear on the vertically yielding roller, substantially as described.

9. In a fodder slitting machine the combination with a slitting cylinder having sharp-pointed knife-shaped teeth projecting from its face for slitting stalks lengthwise, of cross-cutting knives extending lengthwise along the cylinder and having their cutting edges extending along their length, and a bridge-piece and shear blade arranged in proximity to the cylinder and upon which the stalks are supported while they are slit longitudinally and cut transversely, substantially as described.

In testimony whereof I have hereunto set my hand and affixed my seal in presence of two subscribing witnesses.

CHARLES H. TAYLOR. [L. S.]

Witnesses:
FREDERICK SHEPHERD,
HUGH L. MASTER.